United States Patent
Morino et al.

[11] Patent Number: 5,940,079
[45] Date of Patent: Aug. 17, 1999

[54] INFORMATION PROCESSING APPARATUS AND METHOD

[75] Inventors: Takashi Morino, Kawasaki; Hiroyuki Yamamoto, Chigasaki; Toshikazu Ohshima, Kawasaki; Shinji Uchiyama, Yokohama, all of Japan

[73] Assignee: Canon Kabushiki Kaisha, Tokyo, Japan

[21] Appl. No.: 08/803,421

[22] Filed: Feb. 20, 1997

[30] Foreign Application Priority Data

Feb. 22, 1996 [JP] Japan .................................. 8-034931

[51] Int. Cl.$^6$ .................................................. G06T 15/50
[52] U.S. Cl. ......................... 345/430; 345/419; 345/427; 345/437
[58] Field of Search .................................. 345/419, 425, 345/429, 427, 433, 437, 438, 430

[56] References Cited

U.S. PATENT DOCUMENTS

| | | | |
|---|---|---|---|
| 5,469,535 | 11/1995 | Jarvis et al. ........................... | 345/430 |
| 5,490,240 | 2/1996 | Foran et al. ........................... | 345/430 |
| 5,659,672 | 8/1997 | Yutaka et al. ........................... | 345/430 |
| 5,710,875 | 1/1998 | Harashima et al. ..................... | 345/419 |

*Primary Examiner*—Cliff N. Vo
*Attorney, Agent, or Firm*—Fitzpatrick, Cella, Harper & Scinto

[57] ABSTRACT

A two-dimensional data generator and a 2D display controller display a two-dimensional plane image based on three-dimensional data read by a three-dimensional data reading unit. A texture amount calculator calculates a texture amount used in rendering a three-dimensional image based on the three-dimensional data at each of a plurality of viewpoints set in the two-dimensional plane. A texture amount exceeding position display controller clearly displays a viewpoint where the calculated texture data amount exceeds a predetermined value in the two-dimensional plane. A texture amount adjusting unit adjusts the data amount of a desired texture.

31 Claims, 10 Drawing Sheets

INFORMATION PROCESSING APPARATUS AND METHOD

BACKGROUND OF THE INVENTION

The present invention relates to an information processing apparatus and method of adjusting the texture data amount of data expressing a three-dimensional virtual space.

In forming data expressing a three-dimensional virtual space on a computer, the reality with which the virtual space is actually experienced is important. However, the reality has a trade-off relationship with the level of speed performance by which this virtual space is experienced. Therefore, data editing which takes the both factors into consideration is necessary. For example, textures with a high resolution are used to obtain an image with a high reality, but the texture memory capacity of the hardware used is limited. If the total amount of texture data used in drawing one frame in a three-dimensional virtual space exceeds this memory capacity, the performance abruptly decreases.

General examples of the methods used to solve this problem are as follows.

(1) The drawing range of each three-dimensional object to be rendered is set, and no drawing is performed outside the range.
(2) The number of polygons of geometric data expressing a three-dimensional object is reduced.
(3) The amount (to be referred to as the texture amount hereinafter) of texture data mapped on the surfaces of a three-dimensional object is reduced.

In Method (1), an efficient virtual experience is possible because a three-dimensional object which cannot be seen from a certain viewpoint or along a certain line of sight is not rendered. However, it is very difficult to set the drawing range of each three-dimensional object. Additionally, when this method is used singly, there is almost no effect for drawing at a viewpoint from which an entire three-dimensional virtual space can be seen.

Method (2) requires complicated algorithms for changing the existing geometric data and increases the amount of calculations. Therefore, Method (2) is not practical either.

Method (3) is most effective in improving the speed performance. However, there is no index indicating a texture to be reduced and the amount of the reduction, and the effect of the adjustment is not easily confirmed.

SUMMARY OF THE INVENTION

The present invention has been made in consideration of the above prior arts, and has as its object to solve the problems of Method (3) above which is most effective in adjusting a texture amount.

That is, it is an object of the present invention to provide an information processing apparatus and method capable of interactively adjusting a texture amount by giving an index to a texture to be adjusted based on geometric data and textures expressing a three-dimensional virtual space.

It is another object of the present invention to provide an information processing apparatus and method capable of adjusting a texture amount while confirming the effect after the texture amount is adjusted.

To achieve the above objects, an information processing apparatus of the present invention has the following arrangement. That is, an information processing apparatus capable of changing an amount of texture data used in displaying a three-dimensional image based on three-dimensional data comprises calculating means for calculating an amount of texture data used in drawing a three-dimensional image based on three-dimensional data for each of a plurality of viewpoints in a three-dimensional space formed by the three-dimensional data, and first display means for displaying a viewpoint where the amount of texture data calculated by the calculating means exceeds a predetermined value from among the plurality of viewpoints.

Preferably, the apparatus further comprises generating means for generating two-dimensional plane data on the basis of the three-dimensional data, and second display means for displaying a two-dimensional plane image based on the two-dimensional plane data and additionally displaying the viewpoints to be processed by the calculating means in the two-dimensional plane image. The user can easily recognize a viewpoint whose texture amount is to be checked in a virtual space.

Preferably, the viewpoints are lattice points of a lattice constituted by vertical lines and horizontal lines. A viewpoint whose texture amount is to be calculated can be easily determined.

Preferably, the apparatus further comprises setting means for setting spacings between the lines in the lattice. Since the lattice spacings can be freely set, it is possible to set the numbers of viewpoints and lines of sight suitable for a three-dimensional image.

Preferably, the first display means displays a viewpoint where the texture amount exceeds a predetermined value in the two-dimensional plane image displayed by the second display means. The user can readily recognize a portion where the texture amount exceeds the predetermined value, and this facilitates adjusting the texture amount.

Preferably, the apparatus further comprises indicating means for indicating one of the viewpoints displayed in the two-dimensional plane image, and third display means for displaying information about texture data at the viewpoint indicated by the indicating means. For example, by designating a viewpoint where the texture amount exceeds the predetermined value, information about the texture data at the viewpoint is displayed. This further facilitates adjustment of the texture amount.

Preferably, the information displayed by the third display means contains a list of textures used at the viewpoint indicated by the indicating means. This allows the user to readily understand textures used at each viewpoint and improves the operability. For example, when a viewpoint where the texture amount exceeds the predetermined value is selected, textures used at this viewpoint are displayed. Accordingly, the user can determine a texture to be adjusted very easily.

Preferably, the information indicated by the third display means contains a chart indicating a ratio of a data amount of each texture contained in the texture list to a total amount of texture data at the viewpoint. This allows the user to easily recognize the data amount of texture data. That is, even when a plurality of textures are used at a certain viewpoint, the user can easily determine a texture to be adjusted. For example, when a texture having a high data amount ratio is adjusted, the texture amount can be reduced effectively.

Preferably, the information displayed by the third display means contains a list of three-dimensional objects used at the viewpoint.

Preferably, the apparatus further comprises designating means for designating a desired texture from the texture list, and changing means for changing a data amount of the texture designated by the designating means. The adjustment of the texture data can be performed by a series of operations together with, e.g., the confirmation of a viewpoint where the texture amount exceeds the predetermined value. This improves the operability.

Preferably, the apparatus further comprises adjustment confirming means for executing the calculating means and the first display means by using the texture data whose data amount is changed by the changing means. The effect of the texture adjustment can be readily confirmed in accordance with the presence/absence of a viewpoint where the texture data amount exceeds the predetermined value.

Preferably, the apparatus further comprises assigning means for assigning data amount ranks to the plurality of viewpoints on the basis of the texture data amounts calculated by the calculating means, and the first display means changes a display form at each viewpoint in accordance with the rank assigned by the assigning means. The user can visually recognize not only whether the texture amount exceeds the predetermined value but also the distribution of the texture amounts.

Preferably, the assigning means assigns a ratio of the texture data amount at each viewpoint to the predetermined value as the data amount rank.

Preferably, the first display means changes a display color at each viewpoint in accordance with a level assigned by the assigning means.

Preferably, the first display means changes the display color at each viewpoint in accordance with the assigned level and displays colors between viewpoints by interpolating the colors on the basis of the color set at each viewpoint. Since a change in the texture amount is continuously displayed, the user can know the change of the texture amount in more detail.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 1:
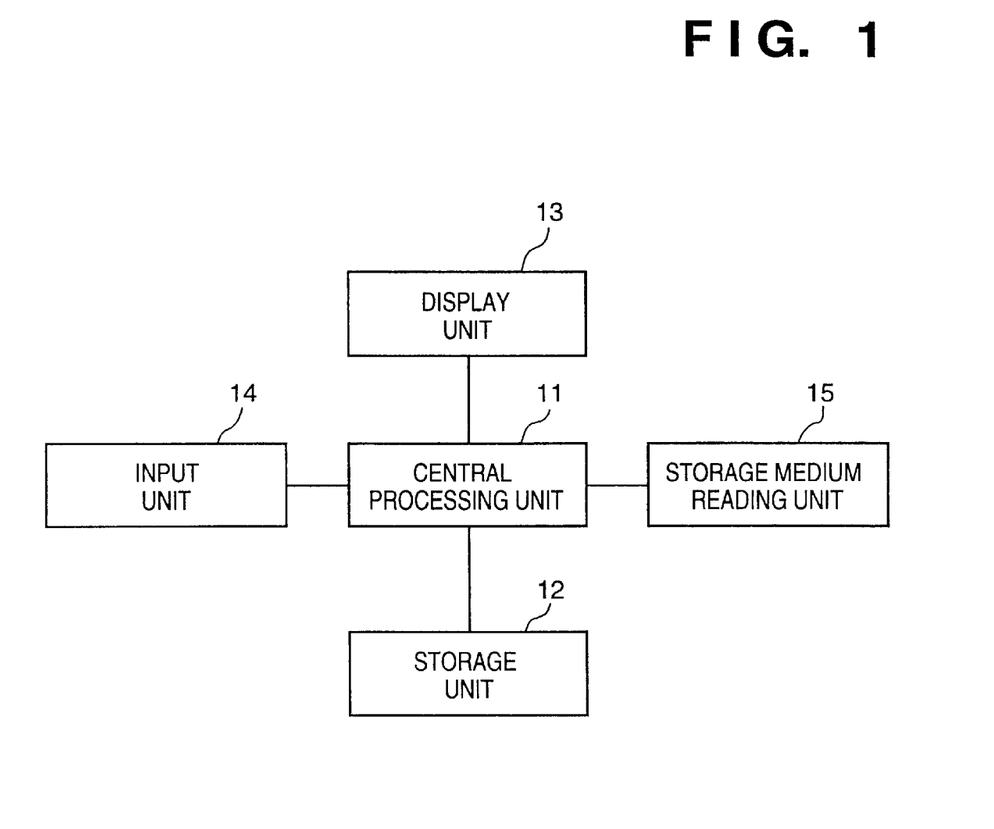
FIG. 1 is a block diagram showing the outline of the arrangement of a three-dimensional virtual space data editing system according to the first embodiment.

FIG. 1 is a block diagram showing the outline of the arrangement of a three-dimensional virtual space data editing system according to the first embodiment. In FIG. 1, a central processing unit 11 realizes various processes in this system. A storage unit 12 stores various control programs executed by the central processing unit 11 and provides work areas which the central processing unit 11 requires when executing various processes. A display unit 13 performs various display processes under the control of the central processing unit 11. 3D and 2D images and auxiliary information (to be described later) are displayed on this display unit 13. An input unit 14 inputs various data and instructions from an operator. This input unit 14 has a keyboard and a pointing device.

A storage medium reading unit 15 reads out various data stored in a storage medium such as an FD (Floppy Disk), an HD (Hard Disk), a CD-ROM, or a magnetic tape. Note that control programs for accomplishing control to be described later can also be stored in any of these storage media. If this is the case, these control programs may be read out by the storage medium reading unit 15, stored in the storage unit 12, and executed by the central processing unit 11.

Figure 2:
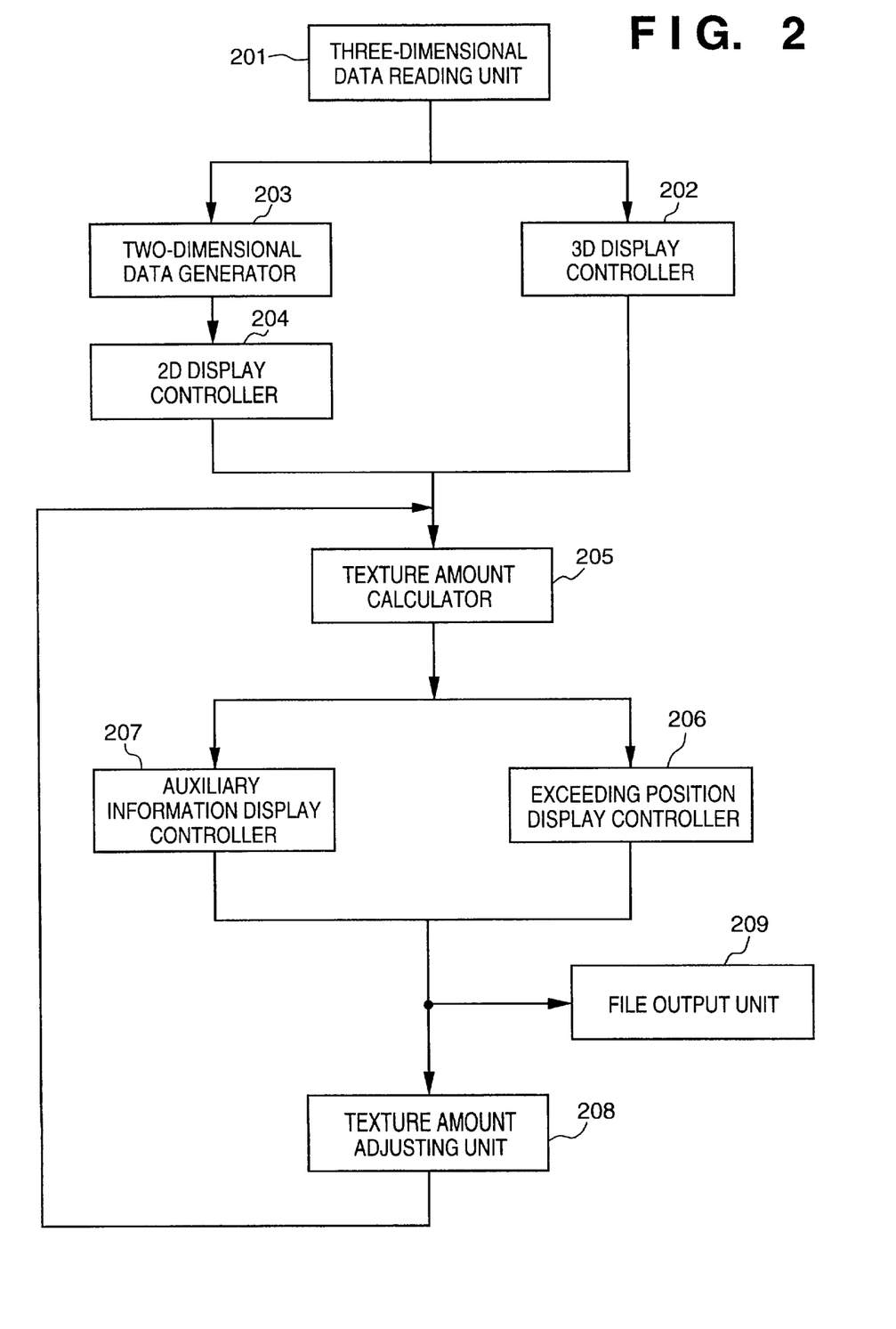
FIG. 2 is a functional block diagram showing the arrangement of functions of the system in the first embodiment.

FIG. 2 is a functional block diagram showing the arrangement of functions of the system in the first embodiment. Note that the functions to be described below are achieved by the central processing unit 11 by executing the control programs stored in the storage unit 12.

Figure 3:
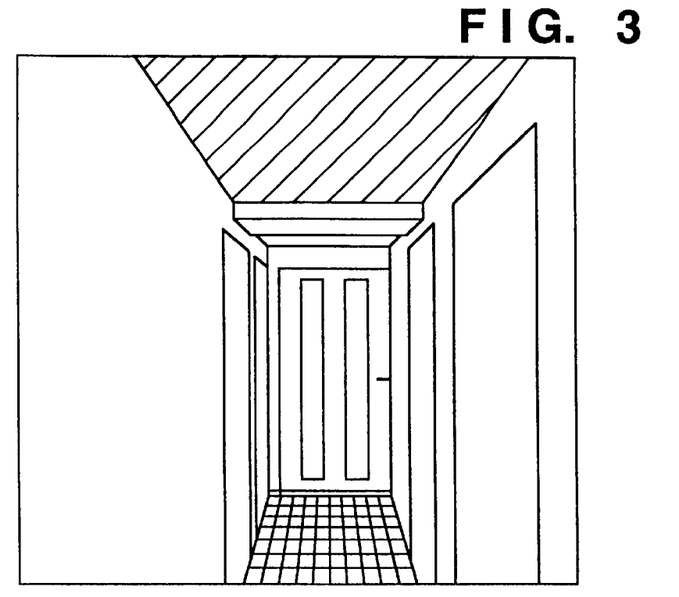
FIG. 3 is a view showing an example of a display obtained by a 3D display function for performing a three-dimensional display in a three-dimensional virtual space.

Reference numeral 201 denotes a three-dimensional data reading unit. When the user designates a three-dimensional virtual space expressing data file to be read from the input unit 14, the central processing unit 11 allows the three-dimensional data reading unit 201 to read, e.g., image information expressing a three-dimensional virtual space from the designated file into the storage unit 12. A 3D display controller 202 three-dimensionally displays the three-dimensional virtual space information stored in the storage unit 12 on the display unit 13. FIG. 3 is a view showing an example of a display obtained by the 3D display function for performing a three-dimensional display in a three-dimensional virtual space. The 3D display function of the 3D display controller 202 can virtually move an object in a virtual space and change lines of sight. To accomplish this, the three-dimensional data reading unit 201 reads out necessary image information on the basis of a viewpoint and a line of sight designated by the input unit 14 and stores the readout information in the storage unit 12, and the 3D display controller 202 renders the stored information. Note that default values are used as the viewpoint and the line of sight in an initial 3D display.

A two-dimensional data generator 203 generates two-dimensional data from three-dimensional space data which the central processing unit 11 supplies from the three-dimensional data reading unit 201, and stores the generated data in the storage unit 12. Two-dimensional data is generated from three-dimensional data by, e.g., (1) obtaining a sectional view by cutting a three-dimensional virtual space at a certain height, or (2) obtaining a projective view by projecting a three-dimensional virtual space onto a horizontal plane.

Reference numeral 204 denotes a 2D display controller. The central processing unit 11 allows the 2D display controller 204 to display a two-dimensional image on the display unit 13 by using the two-dimensional data stored in the storage unit 12.

Figure 4:
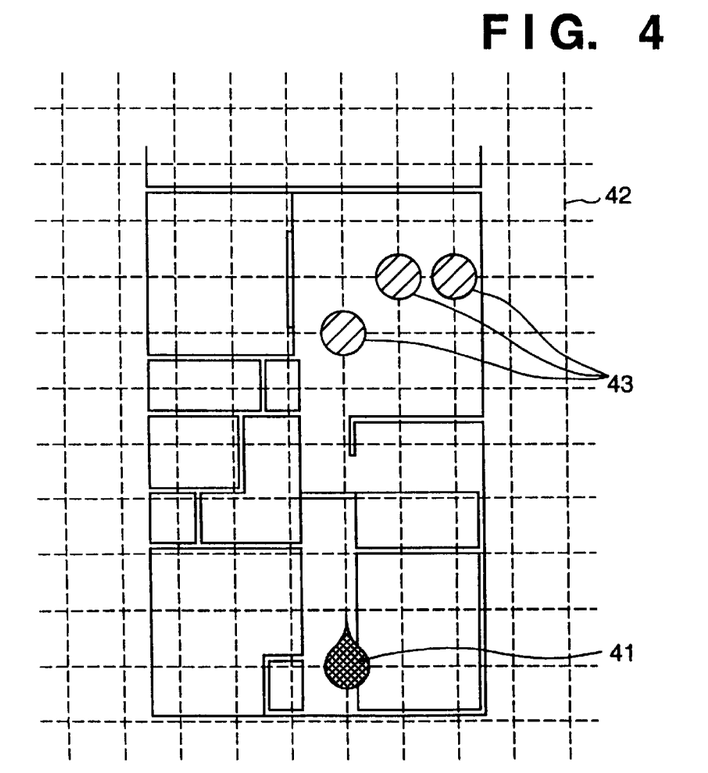
FIG. 4 is a view showing a display example of a plan view of a three-dimensional virtual space in this embodiment.

FIG. 4 is a view showing an example of a display of a plan view of a three-dimensional virtual space in this embodiment. A current position indication 41 shows the viewpoint and the line of sight of a three-dimensional image displayed by the 3D display controller 202. Note that the line of sight is indicated by a direction in which the sharp portion of the current position indication 41 points. When the operator operates the input unit 14 to designate a movement of the viewpoint and a change of the line of sight in the 2D display image, the current position indication 41 moves and rotates in accordance with the designation. When these new viewpoint and line of sight are set, the three-dimensional image displayed by the 3D display controller 202 is updated to a three-dimensional image based on the new viewpoint and line of sight. That is, the central processing unit 11 moves the viewpoint and changes the line of sight in accordance with pointing done by the input unit 14 in the 2D display image on the display screen 13.

A function (to be described later) of calculating texture amounts cannot calculate a total texture amount for infinite numbers of viewpoints and lines of sight. Therefore, it is necessary to designate finite numbers of viewpoints and lines of sight. In this embodiment, for example, the central processing unit 11 displays a lattice 42 in the 2D display image on the display unit 13, and the lattice points are used as a finite number of viewpoints. Also, the directions of lines of sight are four directions of upward, downward, leftward, and rightward from a viewpoint on each lattice point.

A texture amount calculator 205 calculates the total amount of textures used in rendering for the finite numbers of viewpoints and lines of sight using the lattice points described above.

An exceeding position display controller 206 clearly displays a viewpoint at which a texture amount corresponding to the viewpoint or any of its lines of sight corresponding to each lattice point exceeds a fixed amount (a value determined by the user, which is generally the texture memory capacity of the hardware used). For example, the exceeding position display controller 206 visually displays indications denoted by reference numeral 43 (in this embodiment, indications of red points which will be referred to as red point indications 43 hereinafter). From these red point indications 43, the user can determine a region in the 2D display image in which viewpoints require adjustment. Note that this red point indication 43 is displayed on a lattice point if the texture amount of even one of the four lines of sight of the lattice point exceeds a predetermined value.

Figure 5:
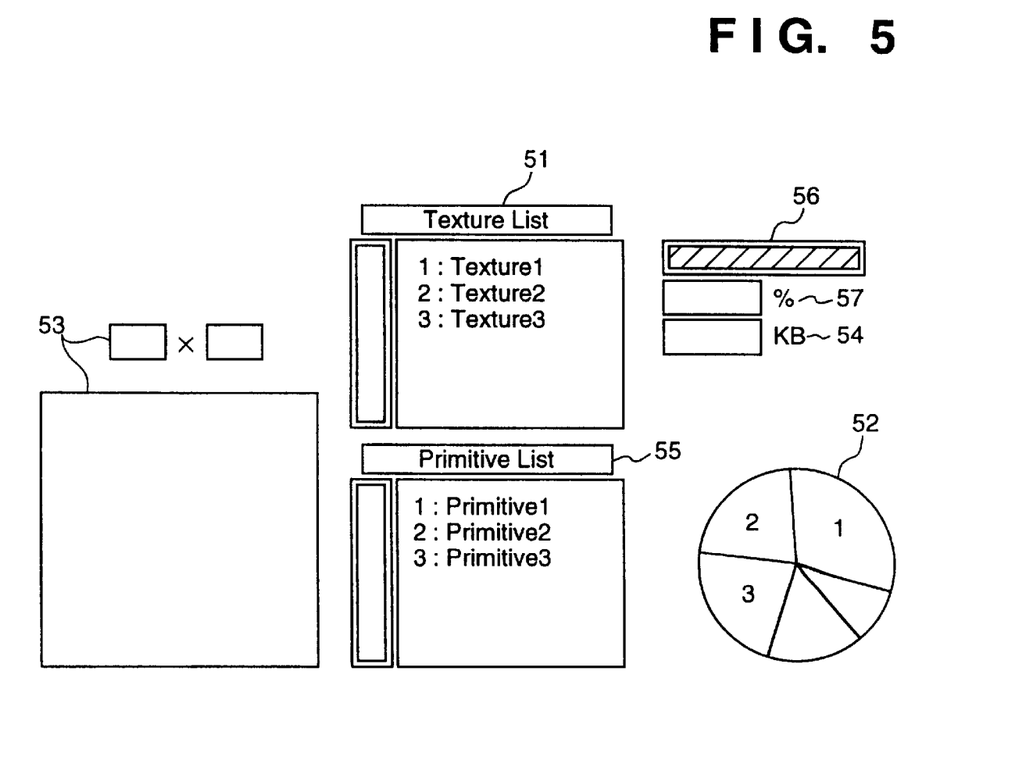
FIG. 5 is a view showing an example of a display of auxiliary information in this embodiment.

An auxiliary information display controller 207 displays various pieces of auxiliary information which the central processing unit 11 requires in adjustment on the display unit 13. FIG. 5 is a view showing an example of a display of the auxiliary information in this embodiment. In this embodiment, the auxiliary information as shown in FIG. 5 is displayed when the user manipulates the input unit 14 to designate one of the lattice points shown in FIG. 4 and designate a desired line of sight. In this embodiment, the following data are displayed in the auxiliary information display.

(1) A list of textures rendered for the designated viewpoint and the designated line of sight is displayed (a texture list 51).

(2) A chart of the data amount of the textures rendered for the designated viewpoint and the designated line of sight is displayed (a chart display 52).

(3) The images and vertical and horizontal dimensions of textures selected by using the texture list 51 are displayed (a texture display 53).

(4) The texture amount of the textures selected by using the texture list 51 is displayed (a texture amount display 54).

(5) A list of three-dimensional objects using the textures selected by using the texture list 51 is displayed (a primitive list 55).

The user can allow the auxiliary information display controller 207 to display the auxiliary information by designating a lattice point where the red point indication 43 is displayed. On the basis of this auxiliary information display, the user can determine textures to be reduced and the amount of the reduction.

When one of the red point indications 43 in FIG. 4 is designated, auxiliary information corresponding to an upward line of sight is displayed. Thereafter, pieces of auxiliary information are switched in order of, e.g., up→right→down→left in accordance with the designation from the input unit 14. The method of designating the line of sight in the display of auxiliary information is not limited to this method. For example, a desired one of leftward, rightward, upward, and downward lines of sight may be designated from the input unit 14. Also, when a lattice point on which the red point indication 43 is displayed is designated, auxiliary information may be first displayed for a direction whose texture amount exceeds a predetermined value. If this lattice point has a plurality of directions whose texture amounts exceed the predetermined value, it is only necessary to display auxiliary information in order of left, right, up, and down.

Reference numeral 208 denotes a texture amount adjusting unit. For a texture requiring adjustment, the user manipulates the input unit 14 to adjust the texture amount of the texture selected from the texture list 51. As one example of designation of adjustment in the texture amount adjusting unit 208, a scroll bar as denoted by reference numeral 56 in FIG. 5 is used in this embodiment. The user adjusts the data amount of a texture by moving the right end portion of the scroll bar 56 by operating the input unit 14.

In accordance with the adjustment of the data amount as described above, as shown in a reduction ratio display 57 of FIG. 5, the central processing unit 11 calculates a ratio (%) to the data amount of an original texture image and displays the ratio on the display unit 13. Simultaneously, the central processing unit 11 calculates the data amount of textures, the total texture amount corresponding to the viewpoint and the line of sight, and the data amount chart and reflects the calculation results in the texture amount display 54, the texture display 53, and the chart display 52. As the method of reducing the data amount of a texture image, the reduction ratio of the resolution is calculated back from the set reduction ratio, and the resolution of the current texture image data is reduced to achieve this reduction ratio of the resolution. In this method, the resolution is reduced while the aspect ratio of the original texture image data is maintained.

Each texture adjusted as above is often used in a plurality of three-dimensional objects, so the texture amount must be recalculated. Accordingly, the texture data whose texture amount is adjusted by the texture amount adjusting unit 208 is supplied to the texture amount calculator 205 where the texture amount is calculated on the basis of the new texture data.

Reference numeral 209 denotes a file output unit. When the operator inputs information indicating that the adjustment of a texture is completed, the file output unit 209 stores the adjusted texture data in the storage unit 12. By reading out the adjusted three-dimensional space expressing data, the user can confirm the effect of the adjustment on the 3D display screen. That is, if the red point indication 43 in the two-dimensional image is extinguished by the adjustment, the user understands that the adjustment is successfully performed. If the red point indication 43 does not disappear, the user understands that the adjustment is unsatisfactory.

Figure 6:
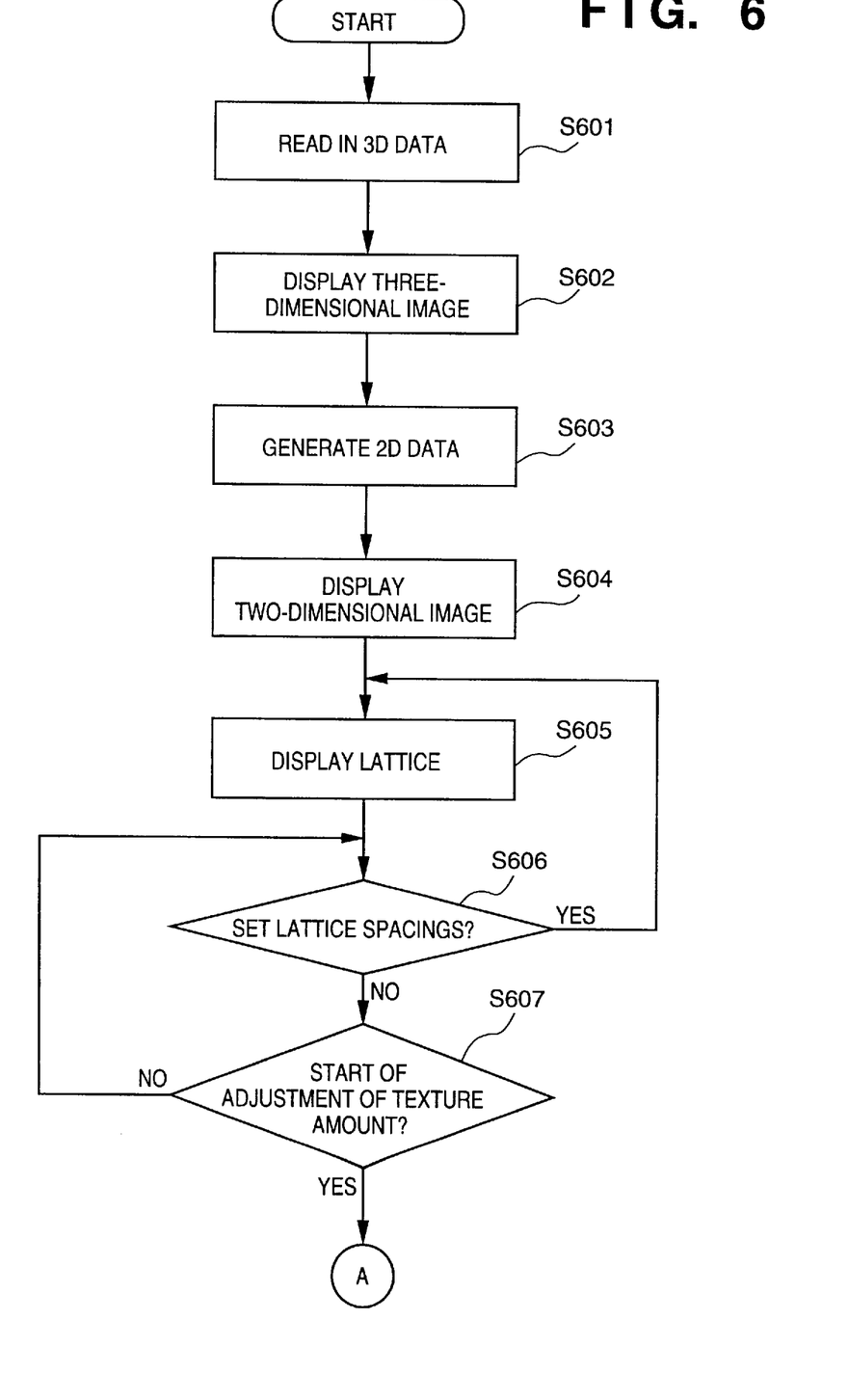
FIG. 6 is a flow chart for explaining the procedure of a texture amount adjustment process in the first embodiment.
Figure 7:
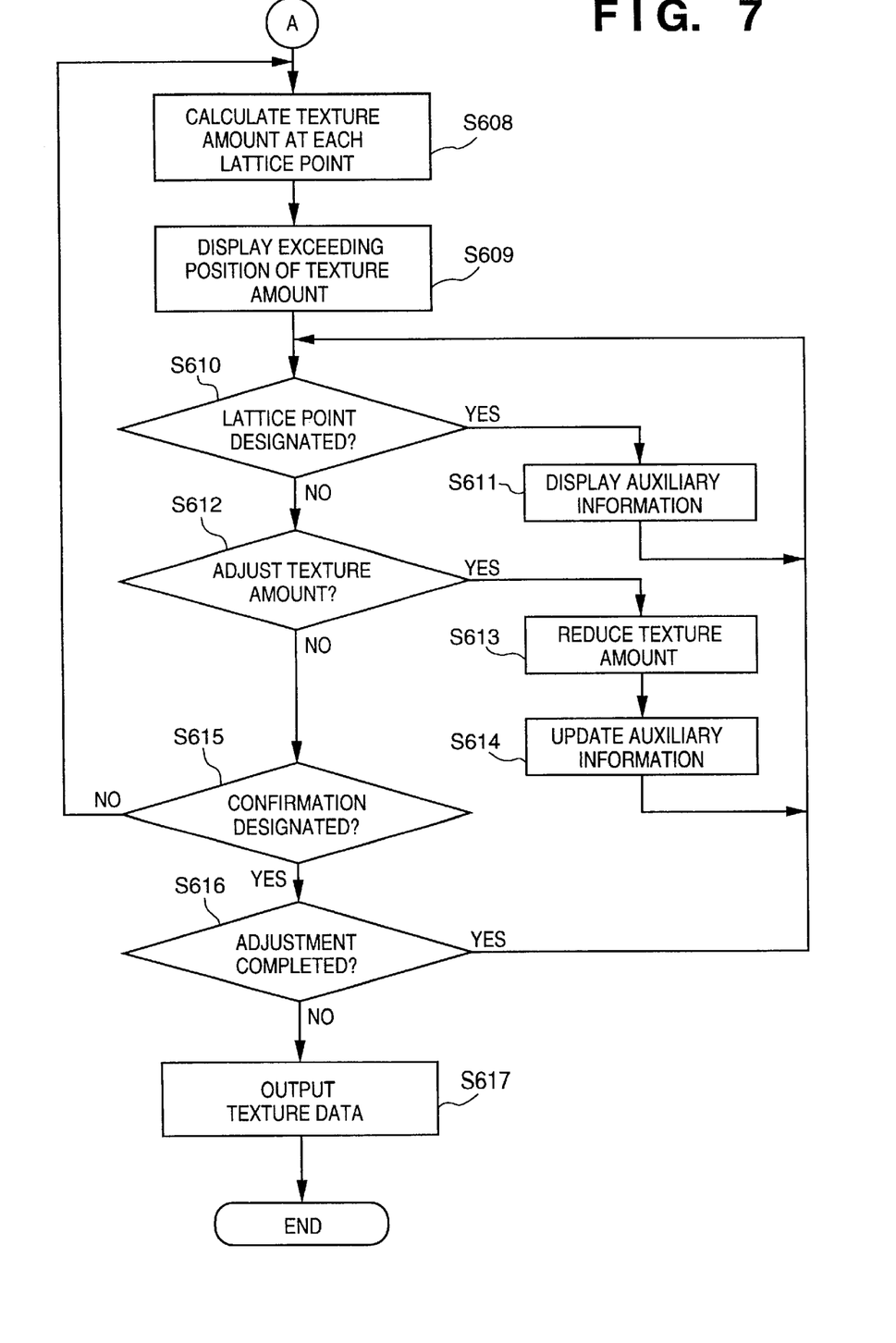
FIG. 7 is a flow chart for explaining the procedure of the texture data adjustment process in the first embodiment.

The operation of the three-dimensional virtual space data editing system of this embodiment having the arrangements of control and functions as above will be described in more detail below. FIGS. 6 and 7 are flow charts for explaining the procedure of the texture amount adjustment process in the first embodiment.

In step S601, the three-dimensional data reading unit 201 reads in three-dimensional data designated by the input unit 14. In step S602, a three-dimensional image based on this three-dimensional data is displayed (FIG. 3). The viewpoint and the line of sight of the displayed three-dimensional image are their respective default values. In step S603, on the basis of the read three-dimensional data, the two-dimensional data generator 203 generates plane image data (two-dimensional data) corresponding to the three-dimensional image. In step S604, the 2D display controller 204 displays a two-dimensional image based on the two-dimensional data (FIG. 4).

In step S605, the lattice 42 indicating a finite number of viewpoints is displayed for texture calculations subsequently performed by the texture amount calculator 205. In steps S606 and S607, designation of setting of the lattice spacings and designation of start of adjustment of a texture amount, respectively, are waited. That is, in step S606, whether there is an input for setting the spacing between vertical lines and the spacing between horizontal lines of the lattice 42 is checked. If there is an input for setting the lattice spacings, the flow returns to step S605 and the lattice 42 is displayed with the set lattice spacings. In step S607, whether the start of adjustment of a texture amount is designated is checked. If the adjustment start is designated, the flow advances to step S608. Since desired lattice spacings can thus be set, a texture amount corresponding to a three-dimensional space can be calculated and the adjustment can be performed more effectively.

In step S608, the texture amount calculator 205 calculates texture amounts in upward, downward, leftward, and rightward lines of sight at each of viewpoints on the lattice points formed by the lattice 42. In step S609, the exceeding position display controller 206 displays red points on lattice points having a line of sight whose texture amount exceeds a predetermined value as exceeding positions.

If one of the lattice points shown in FIG. 4 is designated in step S610, the flow advances to step S611 and the auxiliary information display controller 207 displays the auxiliary information as shown in FIG. 5 for that lattice point. If adjustment of the texture amount is designated in step S612, the texture amount is reduced in step S613 and the auxiliary information is updated in step S614 (by the texture amount adjusting unit 208). As described previously, the user adjusts the texture amount by selecting a texture to be adjusted from the texture list contained in the auxiliary information and operating the scroll bar 56. Also, the updated contents of the auxiliary information in step S614 are already described above.

If an input of confirmation designation is detected in step S615, the processing steps from step S608 are repeated by using the texture data whose texture amount is adjusted. If designation of adjustment completion is detected in step S616, the flow advances to step S617 and the file output unit 209 outputs the adjusted texture data and stores the data in the storage unit 12.

Figure 8:
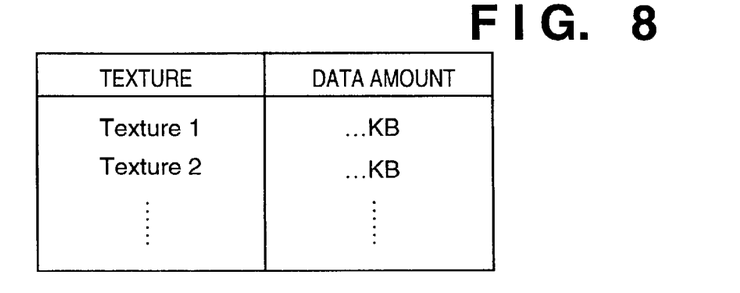
FIG. 8 is a view showing the data format of a table for registering texture data and the data amounts of the data.

The calculation of the texture amount of each lattice point in step S608 is performed following, e.g., a procedure to be described below. FIG. 8 is a view showing a table storing texture data and the data amounts of the texture data. This table is stored in an external storage device, e.g., a hard disk. The central processing unit 11 refers to the table via the storage medium reading unit 15.

Figure 9:
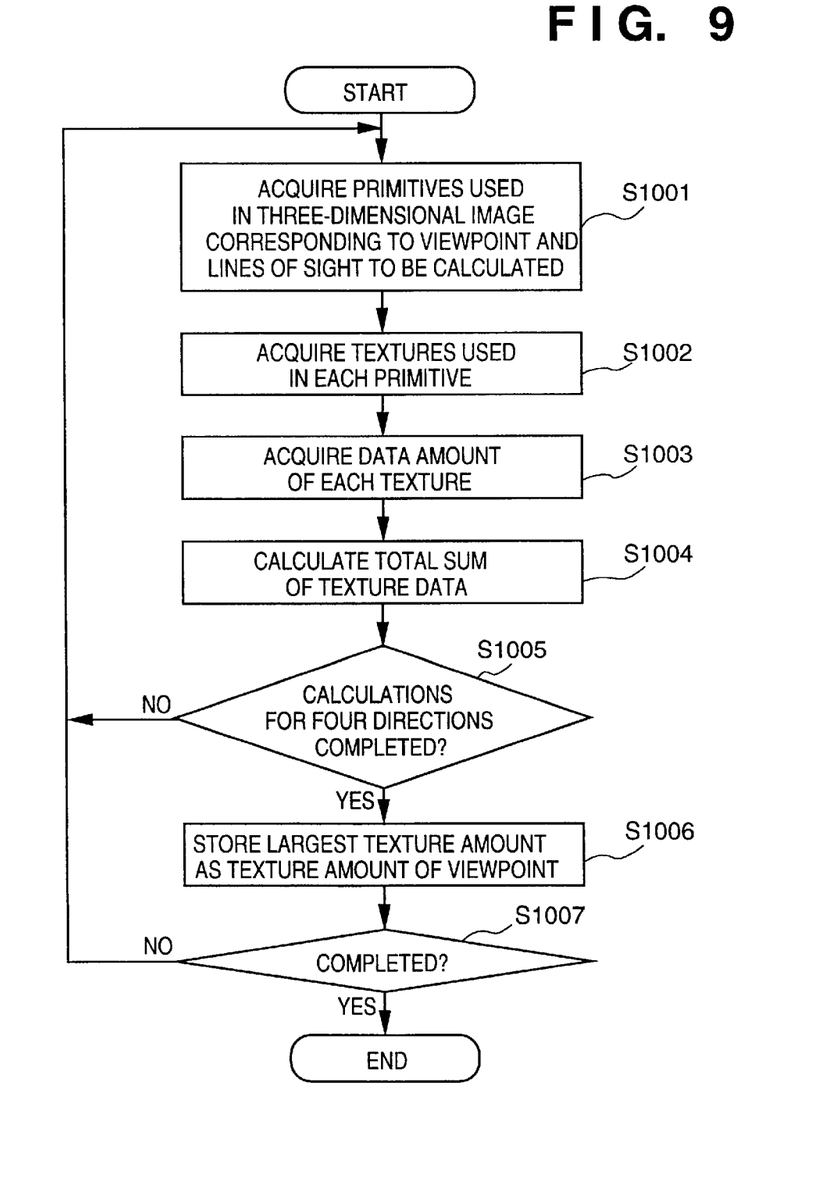
FIG. 9 is a flow chart showing a process of calculating a texture amount at each viewpoint.

FIG. 9 is a flow chart for explaining the procedure of the texture amount calculation. In step S1001, all primitives used in formation of a three-dimensional image corresponding to a viewpoint and its lines of sight to be calculated are acquired. In step S1002, all textures applied to the primitives acquired in step S1001 are acquired. Note that the correspondence between the primitives and the textures is registered in a table. In step S1003, the data amount of each texture obtained in step S1002 is acquired from the table shown in FIG. 8. In step S1004, the total sum of the data amounts of all the primitives acquired in step S1003 is calculated and used as the texture amount of the corresponding viewpoint and line of sight.

In step S1005, whether calculations of the texture amounts in four directions at the viewpoint are completed is checked. If the calculations are not completed, the flow returns to step S1001 to calculate the texture amount of the next line of sight. If the calculations of the texture amounts in the four directions at the viewpoint are completed, the flow advances to step S1006 and a maximum value of the four texture amounts thus calculated is stored as the texture amount of the viewpoint.

In step S1007, whether the above processing is performed for all viewpoints is checked. If any unprocessed viewpoint exists, the flow returns to step S1001 and the next viewpoint is processed. When the texture amounts of all the viewpoints are thus calculated, this process is completed.

In the first embodiment as described above, a viewpoint at which the texture amount exceeds a predetermined value is clearly indicated. This facilitates specifying texture data to be adjusted.

Additionally, since a viewpoint where the texture amount exceeds a predetermined value is clearly indicated in a two-dimensional plane, the user can easily recognize the position in a three-dimensional space where the excess of the texture amount occurs. Also, when the user indicates the excess position of the texture amount in the two-dimensional plane, the auxiliary information such as the texture list 51 used at the corresponding viewpoint and the chart 52 indicating the ratio of each texture amount are displayed. Therefore, the user can easily designate a texture to be adjusted.

Furthermore, viewpoints are indicated in the form of a lattice and the lattice spacings are variable. Accordingly, lattice spacings (the number of viewpoints) suitable for three-dimensional data to be adjusted can be set.

In the above embodiment, vertical lines and horizontal lines of the lattice are respectively equally spaced. However, these line spacings need not be equal. For example, the positions of vertical lines and horizontal lines can be individually designated.

Also, in the above embodiment, the red point indication 43 indicates only a viewpoint. However, an indication indicating a line of sight along which the texture amount exceeds a predetermined value can also be added to this red point indication. If this is the case, the user can intuitively recognize a three-dimensional object which causes the excess texture amount from the line of sight in which the texture amount exceeds a predetermined value. This allows the user to more easily find a texture whose data amount is to be adjusted.

Furthermore, in the above embodiment a texture amount is adjusted by selecting a desired texture from the texture list. However, it is also possible to select a desired three-dimensional object from the primitive list 55 and designate a texture used in this three-dimensional object. For example, when a desired primitive is selected from the primitive list 55, a texture pasted on this primitive is automatically selected from the texture list 51 and set as an object of texture data adjustment. Alternatively, the indication of a texture used in a selected object may be changed in the texture list 51.

[Second Embodiment]

In the first embodiment, a viewpoint at which the texture amount exceeds a predetermined value is clearly indicating by displaying a red point. In the second embodiment, the texture amounts at individual viewpoints are indicated in multiple levels.

Figure 10:
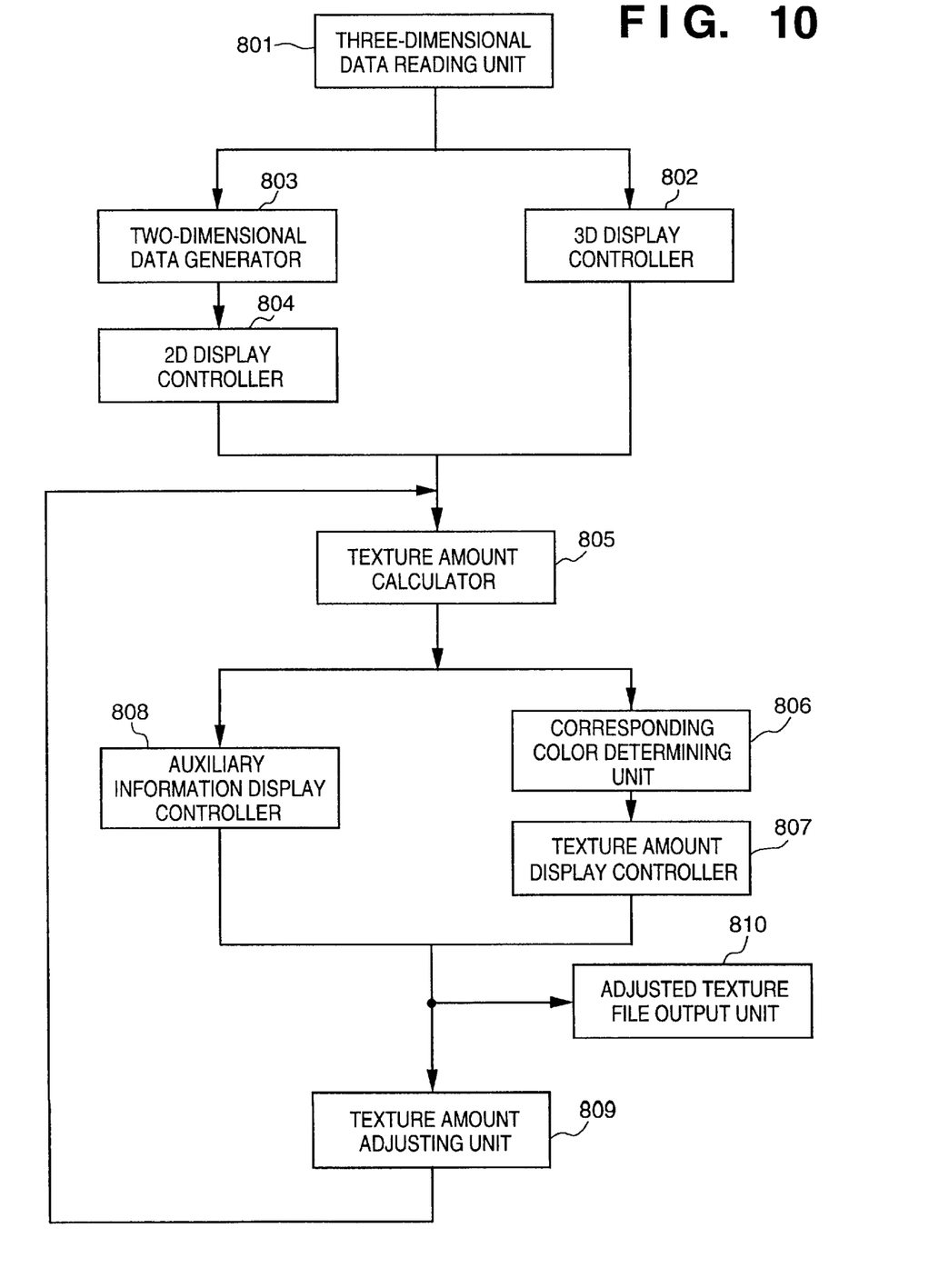
FIG. 10 is a functional block diagram showing the arrangement of functions of a system according to the second embodiment.

The arrangement of control of a system in the second embodiment is the same as in FIG. 1. FIG. 10 is a functional block diagram showing the arrangement of functions of the system according to the second embodiment. In FIG. 10, blocks 801, 802, 803, 804, 805, 808, 809, and 810 realize the same functions as the functional blocks 201, 202, 203, 204, 205, 207, 208, and 209 (FIG. 2), respectively, in the first embodiment. In the second embodiment, a corresponding color determining unit 806 and a texture amount display controller 807 are provided instead of the exceeding position display controller 206. This allows the user to recognize the level of the texture amount at each viewpoint.

On the basis of the calculation results of the texture amounts of a viewpoint and its lines of sight, the corresponding color determining unit 806 determines a color corresponding to the texture amount of the viewpoint. Although each viewpoint includes a plurality of lines of sight, a color corresponding to the texture amount of a viewpoint is determined by using the largest texture amount at the viewpoint. The texture amount display controller 807 displays a color corresponding to the texture amount at each lattice point in a two-dimensional image. This process will be described in more detail below.

Figure 11:
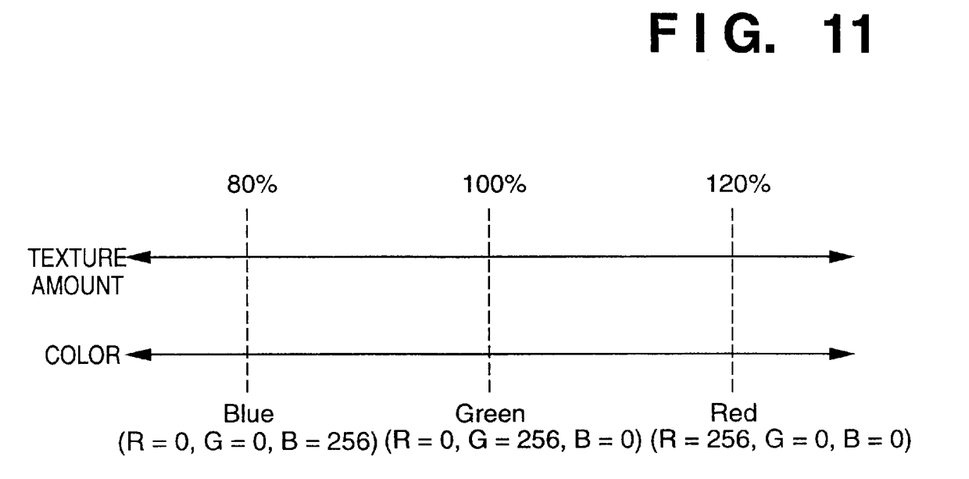
FIG. 11 is a view showing an example of a relationship between a texture amount and a display color in the second embodiment.

In this embodiment, different colors are assigned to a plurality of predetermined threshold levels, and a color level corresponding to the texture amount at each lattice point is displayed on a display unit 13. FIG. 11 is a view showing an example of the relationship between the texture amount and the display color in the second embodiment. Referring to FIG. 11, three threshold levels (80%, 100%, and 120%) are set and blue, green, and red (each of R, G, and B has 256 gradation levels) are assigned to these levels. A predetermined value (determined by the user; which is generally the capacity of a texture memory of the hardware used) is set as the level of 100%, and texture amount ratios of 80% and 120% are the remaining two levels.

Figure 12:
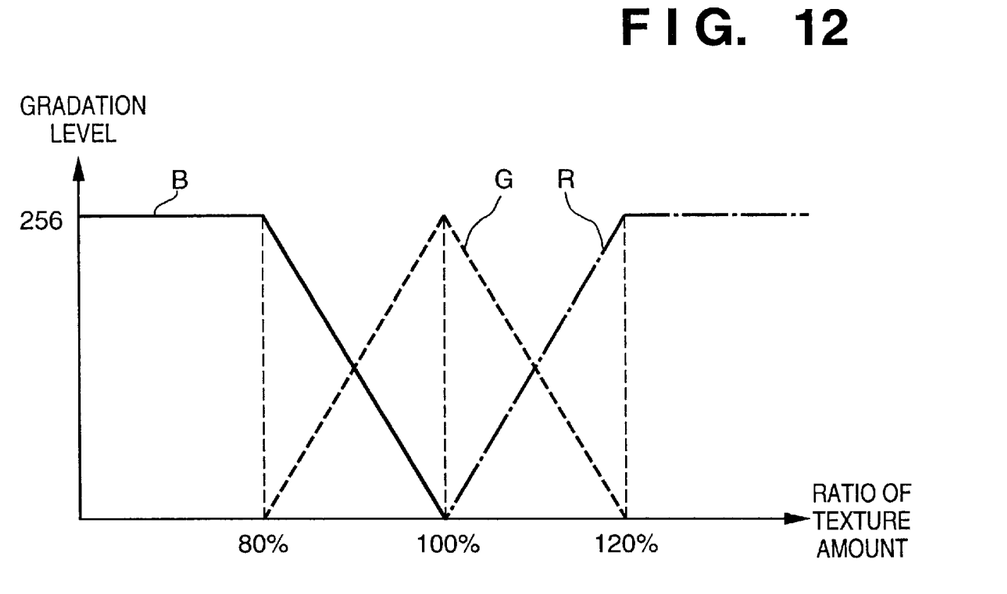
FIG. 12 is a graph for explaining the setting of a display color corresponding to a texture amount.

A central processing unit 11 assigns blue (B=256, R=G= 0), green (G=256, B=R=0), and red (R=256, G=B=0) to the levels of 80%, 100%, and 120%, respectively. RGB values are linearly assigned to colors between these levels. That is, the levels of R, G, and B are determined as shown in FIG. 12. Accordingly, at a position where the data amount is 90%, for example, R=0 and G=B=128. Also, only blue is displayed for a data amount of 80% or less, and only red is displayed for a data amount or 120% or more.

In the second embodiment as described above, the user can visually recognize the texture amount at each viewpoint. Additionally, the central processing unit 11 renders a color corresponding to the total texture amount at each viewpoint on the display unit 13 and also renders colors between viewpoints by shading the colors. Consequently, the texture amounts can be rendered in smoothly changing colors. As an example, the color of a line in a lattice is gradually changed from the color at the lattice point at one end of the line toward the color at the lattice point at the other end. With this function, the user can visually recognize not only the exceeding positions of texture amounts but also the degrees and the distribution of the excesses.

As has been described above, each of the above embodiments facilitates editing three-dimensional virtual space expressing data for performing a comfortable display operation in a system by which the user experiences a virtual space. That is, texture amounts are used as objects to be edited, and the texture memory capacity as the characteristic feature of the hardware used is set. The user performs adjustment such that a texture amount used in rendering one frame of a three-dimensional image does not exceed this memory capacity. This adjustment is easy because a two-dimensional image and various pieces of auxiliary information as indices of the adjustment are displayed. Also, a two-dimensional image and the calculation result of the texture amount at each viewpoint are displayed by using the adjusted texture data. This allows the user to readily confirm the effect of the adjustment. Furthermore, the user can visually confirm the exceeding position and the exceeding process of a texture in a three-dimensional virtual space.

The present invention can be applied to a system constituted by a plurality of devices (e.g., host computer, interface, reader, printer) or to an apparatus (e.g., copying machine, facsimile apparatus) comprising a single device.

Further, the object of the present invention can also be achieved by providing a storage medium storing program codes for performing the above-mentioned functions according to the embodiments to a system or an apparatus, reading the program codes with a computer (e.g., CPU, MPU) of the system or apparatus from the storage medium, and then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the above-mentioned functions according to the above embodiments are realized by executing the program codes which are read by a computer, the present invention includes a case where on OS (Operating System) or the like working on the computer performs some or all processes in accordance with designations of the program codes and realizes functions according to the above embodiments.

Furthermore, the present invention also includes a case where, after the program codes read from the storage medium are written in a function expansion board which is inserted into the computer or in a memory provided in a function expansion unit which is connected to the computer, CPU or the like contained in the function expansion board or unit performs a part or entire process in accordance with designations of the program codes and realizes functions of the above embodiments.

When the present invention is applied to the storage medium, the storage medium stores the program codes corresponding to the flow charts explained previously. In short, the storage medium stores modules shown in a memory map example of FIG. 13.

Figure 13:
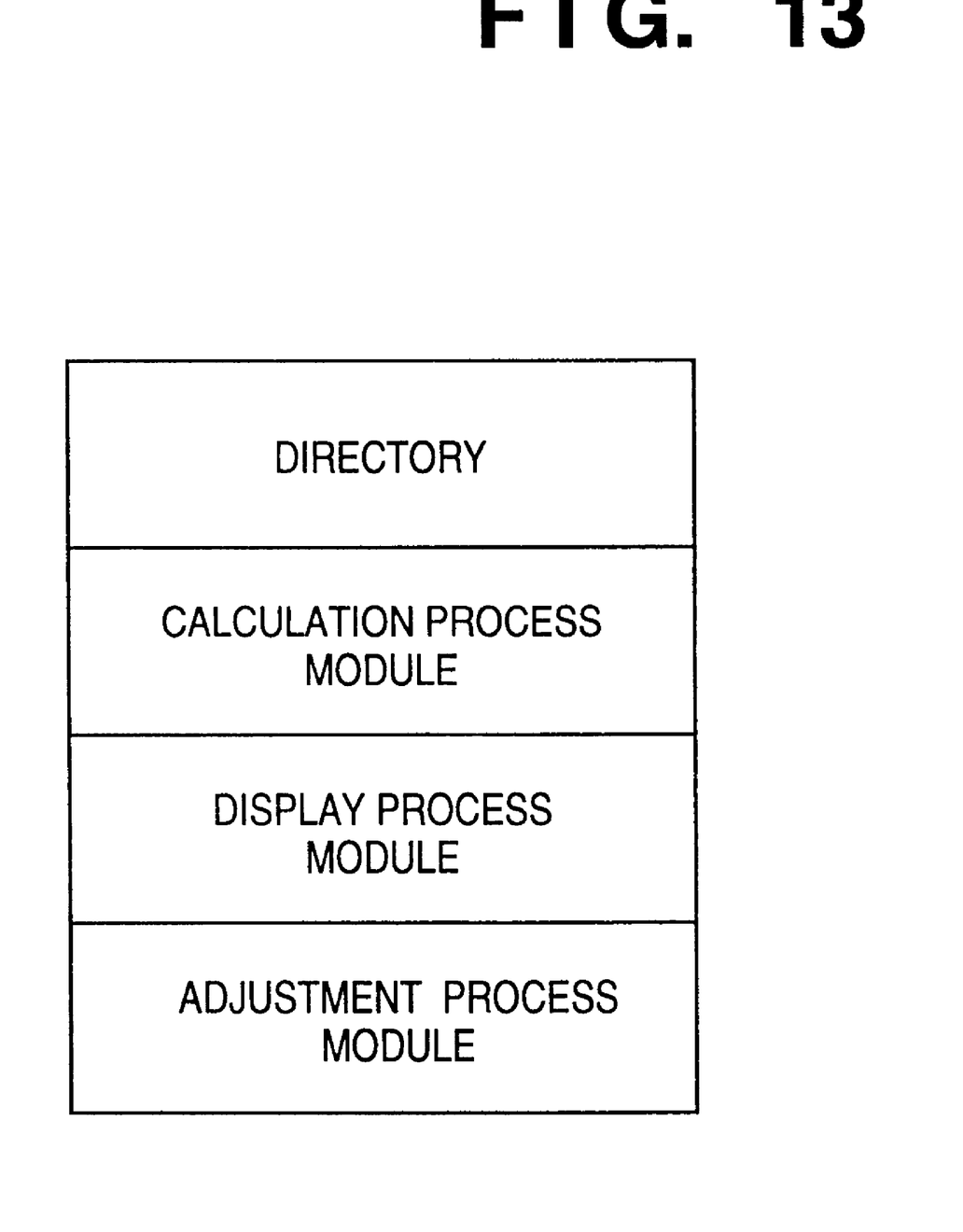
FIG. 13 is a view showing an example of the data format of a storage medium for storing control programs according to the present invention.

That is, it is only necessary to store the program codes of at least a "calculation process module", a "display process module", and an "adjustment process module" in the storage medium.

The calculation process module is a program module which accomplishes a calculation process of calculating the amounts of texture data in rendering a three-dimensional image based on three-dimensional data at a plurality of viewpoints in a three-dimensional space constituted by the three-dimensional data. The display process module is a program module which realizes a display process of clearly displaying a viewpoint at which the texture data amount calculated in the calculation process exceeds a predetermined value. The adjustment process module is a program module which achieves an adjustment process of adjusting the texture data amounts used in rendering the three-dimensional data. With the above module configuration, a position where the texture amount exceeds a predetermined value is clearly indicated when a three-dimensional space is rendered. This gives an index to a texture in the adjustment process. Also, when the calculation process and the display process are performed by using the adjusted textures, the user can confirm the effect of the adjustment process.

In the present invention as has been described above, it is possible to give an index to a texture to be adjusted from geometric data and textures expressing a three-dimensional virtual space and to interactively adjust the texture amount.

Also, in the present invention, it is possible to adjust a texture amount while confirming the effect after the texture amount is adjusted. Consequently, the texture amount adjustment can be performed more easily and appropriately.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus capable of changing an amount of texture data used in displaying a three-dimensional image based on three-dimensional data, comprising:

calculating means for calculating an amount of texture data used in rendering a three-dimensional image based on three-dimensional data for each of a plurality of viewpoints in a three-dimensional space formed by the three-dimensional data; and first display means for displaying a viewpoint where the amount of texture data calculated by said calculating means exceeds a predetermined value from among the plurality of viewpoints.

2. The apparatus according to claim 1, further comprising:

generating means for generating two-dimensional plane data on the basis of the three-dimensional data; and second display means for displaying a two-dimensional plane image based on the two-dimensional plane data and additionally displaying the viewpoints to be processed by said calculating means in the two-dimensional plane image.

3. The apparatus according to claim 2, wherein the viewpoints are lattice points of a lattice constituted by vertical lines and horizontal lines.

4. The apparatus according to claim 3, further comprising setting means for setting spacings between the lines in the lattice.

5. The apparatus according to claim 2, wherein said first display means displays a viewpoint where the texture amount exceeds a predetermined value in the two-dimensional plane image displayed by said second display means.

6. The apparatus according to claim 2, further comprising:

indicating means for indicating one of the viewpoints displayed in the two-dimensional plane image; and third display means for displaying information about texture data at the viewpoint indicated by said indicating means.

7. The apparatus according to claim 6, wherein the information displayed by said third display means contains a list of textures used at the viewpoint indicated by said indicating means.

8. The apparatus according to claim 7, wherein the information indicated by said third display means contains a chart indicating a ratio of a data amount of each texture contained in the texture list to a total amount of texture data at the viewpoint.

9. The apparatus according to claim 7, further comprising:

designating means for designating a desired texture from the texture list; and changing means for changing a data amount of the texture designated by said designating means.

10. The apparatus according to claim 9, further comprising adjustment confirming means for executing said calculating means and said first display means by using the texture data whose data amount is changed by said changing means.

11. The apparatus according to claim 6, wherein the information displayed by said third display means contains a list of three-dimensional objects used at the viewpoint.

12. The apparatus according to claim 1, further comprising assigning means for assigning data amount ranks to the plurality of viewpoints on the basis of the texture data amounts calculated by said calculating means, and wherein said first display means changes a display form at each viewpoint in accordance with the rank assigned by said assigning means.

13. The apparatus according to claim 12, wherein said assigning means assigns a ratio of the texture data amount at each viewpoint to the predetermined value as the data amount rank.

14. The apparatus according to claim 12, wherein said first display means changes a display color at each viewpoint in accordance with a level assigned by said assigning means.

15. The apparatus according to claim 14, wherein said first display means changes the display color at each viewpoint in accordance with the assigned level and displays colors between viewpoints by interpolating the colors on the basis of the color set at each viewpoint.

16. A method of controlling an information processing apparatus capable of changing an amount of texture data used in displaying a three-dimensional image based on three-dimensional data, comprising:

the calculating step of calculating an amount of texture data used in rendering a three-dimensional image based on three-dimensional data for each of a plurality of viewpoints in a three-dimensional space formed by the three-dimensional data; and the first display step of displaying a viewpoint where the amount of texture data calculated in the calculating step exceeds a predetermined value from among the plurality of viewpoints.

17. The method according to claim 16, further comprising:

the generating step of generating two-dimensional plane data on the basis of the three-dimensional data; and the second display step of displaying a two-dimensional plane image based on the two-dimensional plane data and additionally displaying the viewpoints to be processed in the calculating step in the two-dimensional plane image.

18. The method according to claim 17, wherein the viewpoints are lattice points of a lattice constituted by vertical lines and horizontal lines.

19. The method according to claim 18, further comprising the setting step of setting spacings between the lines in the lattice.

20. The method according to claim 17, wherein the first display step comprises displaying a viewpoint where the texture amount exceeds a predetermined value in the two-dimensional plane image displayed in the second display step.

21. The method according to claim 17, further comprising:

the indicating step of indicating one of the viewpoints displayed in the two-dimensional plane image; and the third display step of displaying information about texture data at the viewpoint indicated in the indicating step.

22. The method according to claim 21, wherein the information displayed in the third display step contains a list of textures used at the viewpoint indicated in the indicating step.

23. The method according to claim 22, wherein the information indicated in the third display step contains a chart indicating a ratio of a data amount of each texture contained in the texture list to a total amount of texture data at the viewpoint.

24. The method according to claim 22, further comprising:

the designating step of designating a desired texture from the texture list; and the changing step of changing a data amount of the texture designated in the designating step.

25. The method according to claim 24, further comprising the adjustment confirming step of executing the calculating step and the first display step by using the texture data whose data amount is changed in the changing step.

26. The method according to claim 21, wherein the information displayed in the third display step contains a list of three-dimensional objects used at the viewpoint.

27. The method according to claim 16, further comprising the assigning step of assigning data amount ranks to the plurality of viewpoints on the basis of the texture data amounts calculated in the calculating step, and wherein the first display step comprises changing a display form at each viewpoint in accordance with the rank assigned in the assigning step.

28. The method according to claim 27, where the assigning step comprises assigning a ratio of the texture data amount at each viewpoint to the predetermined value as the data amount rank.

29. The method according to claim 27, wherein the first display step comprises changing a display color at each viewpoint in accordance with a level assigned in the assigning step.

30. The method according to claim 29, wherein the first display step comprises changing the display color at each viewpoint in accordance with the assigned level and displays colors between viewpoints by interpolating the colors on the basis of the color set at each viewpoint.

31. A computer readable memory storing a control program for adjusting an amount of texture data used in displaying a three-dimensional image based on three-dimensional data, comprising:

a code of the calculating step of calculating an amount of texture data used in rendering a three-dimensional image based on three-dimensional data for each of a plurality of viewpoints in a three-dimensional space formed by the three-dimensional data;

a code of the display step of displaying a viewpoint where the amount of texture data calculated in the calculating step exceeds a predetermined value from among the plurality of viewpoints; and a code of the adjusting step of adjusting a texture amount used in rendering the three-dimensional data.

* * * * *